United States Patent
Deselaers et al.

(10) Patent No.: US 10,346,411 B1
(45) Date of Patent: Jul. 9, 2019

(54) AUTOMATIC TARGET AUDIENCE SUGGESTIONS WHEN SHARING IN A SOCIAL NETWORK

(71) Applicant: Google Inc., Mountain View, CA (US)

(72) Inventors: Thomas Deselaers, Zurich (CH); Daniel Martin Keysers, Stallikon (CH)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 13/831,481

(22) Filed: Mar. 14, 2013

(51) Int. Cl.
*G06F 16/2457* (2019.01)

(52) U.S. Cl.
CPC .............................. *G06F 16/24578* (2019.01)

(58) Field of Classification Search
CPC .. G06Q 30/02; G06Q 10/10; G06F 17/30864; G06F 17/30038; G06F 17/30265; G06F 17/30598; G06F 17/30705; G06F 17/30707; G06F 17/3071
USPC .......................................................... 707/749
See application file for complete search history.

(56) References Cited

U.S. PATENT DOCUMENTS

| | | | | |
|---|---|---|---|---|
| 6,546,390 | B1* | 4/2003 | Pollack | G06Q 10/107 707/999.007 |
| 8,306,809 | B2* | 11/2012 | Hammer et al. | 704/9 |
| 8,838,581 | B2* | 9/2014 | Tseng | G06Q 30/00 707/721 |
| 8,977,649 | B1* | 3/2015 | Hassidim et al. | 707/798 |
| 8,984,074 | B2* | 3/2015 | Monaco | G06Q 10/107 709/206 |
| 2003/0212680 | A1* | 11/2003 | Bates | G06Q 10/109 |
| 2004/0039786 | A1* | 2/2004 | Horvitz | G05B 19/404 709/207 |
| 2005/0021649 | A1* | 1/2005 | Goodman | G06F 21/316 709/207 |
| 2005/0060638 | A1* | 3/2005 | Mathew | G06Q 10/06 715/255 |
| 2005/0076084 | A1* | 4/2005 | Loughmiller | H04L 51/12 709/206 |
| 2005/0159970 | A1* | 7/2005 | Buyukkokten et al. | 705/1 |
| 2006/0015561 | A1* | 1/2006 | Murphy | H04L 51/12 709/206 |
| 2007/0078973 | A1* | 4/2007 | Kussmaul | G06Q 10/107 709/224 |
| 2007/0130368 | A1 | 6/2007 | Martin et al. | |
| 2007/0179945 | A1* | 8/2007 | Marston | G06Q 10/107 |
| 2007/0208856 | A1* | 9/2007 | Rounthwaite | H04L 51/12 709/225 |
| 2007/0214121 | A1* | 9/2007 | Ebanks | 707/3 |
| 2008/0004941 | A1* | 1/2008 | Calabria | 705/10 |

(Continued)

*Primary Examiner* — Pierre M Vital
*Assistant Examiner* — Andrew N Ho
(74) *Attorney, Agent, or Firm* — McDermott Will & Emery LLP

(57) ABSTRACT

A method includes receiving from a user a message for sharing with others, identifying message attributes of the received message, the message attributes comprising message content, identifying a group of recipients with whom the user has previously interacted, computing a relevance score for each recipient in the group of recipients, ranking each recipient in the group of recipients according to the relevance score and determining one or more target recipients for the received message from the group of target recipients ranked according to the relevance score, the determined target recipients having a ranking within a predetermined threshold of highest relevance scores.

24 Claims, 6 Drawing Sheets

(56) References Cited

U.S. PATENT DOCUMENTS

| | | | |
|---|---|---|---|
| 2008/0189169 A1* | 8/2008 | Turpin et al. | 705/10 |
| 2009/0204601 A1* | 8/2009 | Grasset | 707/5 |
| 2010/0017194 A1 | 1/2010 | Hammer et al. | |
| 2010/0211644 A1* | 8/2010 | Lavoie | G06Q 10/107 709/206 |
| 2010/0223341 A1* | 9/2010 | Manolescu | G06F 17/30867 709/206 |
| 2010/0228614 A1* | 9/2010 | Zhang et al. | 705/14.16 |
| 2010/0293170 A1* | 11/2010 | Hall | H04L 12/588 707/750 |
| 2011/0010423 A1* | 1/2011 | Thatcher | G06Q 10/107 709/206 |
| 2011/0040843 A1* | 2/2011 | Kussmaul | G06Q 10/107 709/206 |
| 2011/0161270 A1* | 6/2011 | Arnett | G06F 21/31 706/46 |
| 2011/0173274 A1* | 7/2011 | Sood | G06Q 10/10 709/206 |
| 2011/0196933 A1* | 8/2011 | Jackson et al. | 709/206 |
| 2012/0005224 A1* | 1/2012 | Ahrens | G06Q 10/10 707/769 |
| 2012/0166452 A1* | 6/2012 | Tseng | 707/749 |
| 2012/0246174 A1* | 9/2012 | Spears | G06Q 30/02 707/749 |
| 2012/0260188 A1* | 10/2012 | Park | G06Q 10/107 715/739 |
| 2012/0265771 A1* | 10/2012 | Suh et al. | 707/749 |
| 2012/0272160 A1* | 10/2012 | Spivack | G06Q 10/10 715/752 |
| 2013/0046770 A1* | 2/2013 | Tseng | G06Q 30/00 707/748 |
| 2014/0067937 A1* | 3/2014 | Bosworth | H04L 65/403 709/204 |

\* cited by examiner

AUTOMATIC TARGET AUDIENCE SUGGESTIONS WHEN SHARING IN A SOCIAL NETWORK

BACKGROUND

Choosing the right audience for sharing a social network post can take up significant time and unnecessarily clutter the sharing experience.

SUMMARY

The subject disclosure relates generally to electronic communications, and more particularly to proposing a target audience for an electronic message.

The subject disclosure relates to a machine-implemented method for suggesting target recipients for a message. The method includes receiving from a user a message for sharing with others, identifying message attributes of the received message, the message attributes comprising message content, identifying a group of recipients with whom the user has previously interacted and computing a relevance score for each recipient in the group of recipients, wherein the relevance score corresponds to how closely each recipient in the group of recipients relates to the identified message attributes. The method also includes ranking each recipient in the group of recipients according to the relevance score and determining one or more target recipients for the received message from the group of target recipients ranked according to the relevance score, the determined target recipients having a ranking within a predetermined threshold of highest relevance scores.

These and other aspects may include one or more of the following features. The method may further include processing the message attributes to identify a signal for identifying the group of recipients with whom the user has previously interacted. The method may furthermore include generating a target recipient recommendation comprising a list of the determined one or more target recipients. Furthermore, an indication to generate a new target recipient recommendation comprising at least one of, more determined target recipients or fewer determined target recipients than included on the list of determined one or more target recipients may be received from the recipient. The list of determined target recipients for the received message may be adjusted based on the indication received from the user and a new target recipient recommendation comprising the adjusted list of determined target recipients from the received message may be generated. The group of recipients with whom the user has previously interacted may include one or more of, recipients at a social networking site or recipients in an email application. The relevance score may correspond to how often each recipient in the group of recipients has interacted with the user.

The disclosed subject matter also relates to a machine-readable medium comprising instructions stored therein, which when executed by the processors, cause the processors to perform operations that include receiving a message for sharing with others at a social network, identifying message attributes of the received message, the message attributes comprising message content, processing the message attributes to identify a signal for selecting one or more previously shared messages that correspond to the signal or a group of contacts associated with the signal, selecting the one or more previously shared messages associated with the signal or the group of contacts associated with the signal and determining one or more target recipients for the received message based on the selected one or more previously shared messages associated with the signal or the selected group of contacts associated with the signal.

These and other aspects may include one or more of the following features. The operations may further include generating a target recipient recommendation comprising the determined one or more target recipients. The message may be a social network post or an email message.

Selecting a previously shared message having a message attribute that corresponds to a message attribute of the received message may include comparing a message attribute of the received message to message attributes of one or more previously shared messages. The one or more previously shared messages may have been shared by a user who composed the received message. Selecting a previously shared message having a message attribute that corresponds to a message attribute of the received message may include selecting a group of most relevant previously shared messages. Recipients of the selected group of most relevant previously shared messages may be identified and one or more target recipients may be determined for the received message based on the identified recipients of the selected group of the most relevant previously shared messages.

The disclosed subject matter further relates to a system that includes a message module configured to receive a message for sharing with others, a message attribute module configured to identify message attributes of the received message, the message attributes comprising message content and a prior recipients module configured to identify a group of recipients with whom the user has previously interacted. The system further includes a scoring module configured to compute a relevance score for each recipient in the group of recipients, wherein the relevance score corresponds to how closely each recipient in the group of recipients relates to the identified message attributes, a ranking module configured to rank each recipient in the group of recipients according to the relevance score and a target recipients module, configured to determine one or more target recipients for the received message from the group of target recipients ranked according to the relevance score, the determined target recipients having a ranking within a predetermined threshold of highest relevance scores.

These and other aspects may include one or more of the following features. The system may also include a recommendation module, configured to generate a target recipient recommendation comprising a list of the determined one or more target recipients. The recommendation module may be further configured to receive from the user an indication to generate a new target recipient recommendation comprising at least one of, more determined target recipients or fewer determined target recipients than included on the list of the determined one or more target recipients, adjust the list of determined target recipients for the received message based on the indication received from the user and generate a new target recipient recommendation comprising the adjusted list of determined target recipients from the received message.

The prior recipients module may further be configured to process the message attributes to identify a signal for identifying the group of recipients with whom the user has previously interacted.

These and other aspects may provide one or more of the following advantages. The message sharing experience is more efficient and less obstructed by tasks such as selecting an audience for a message.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
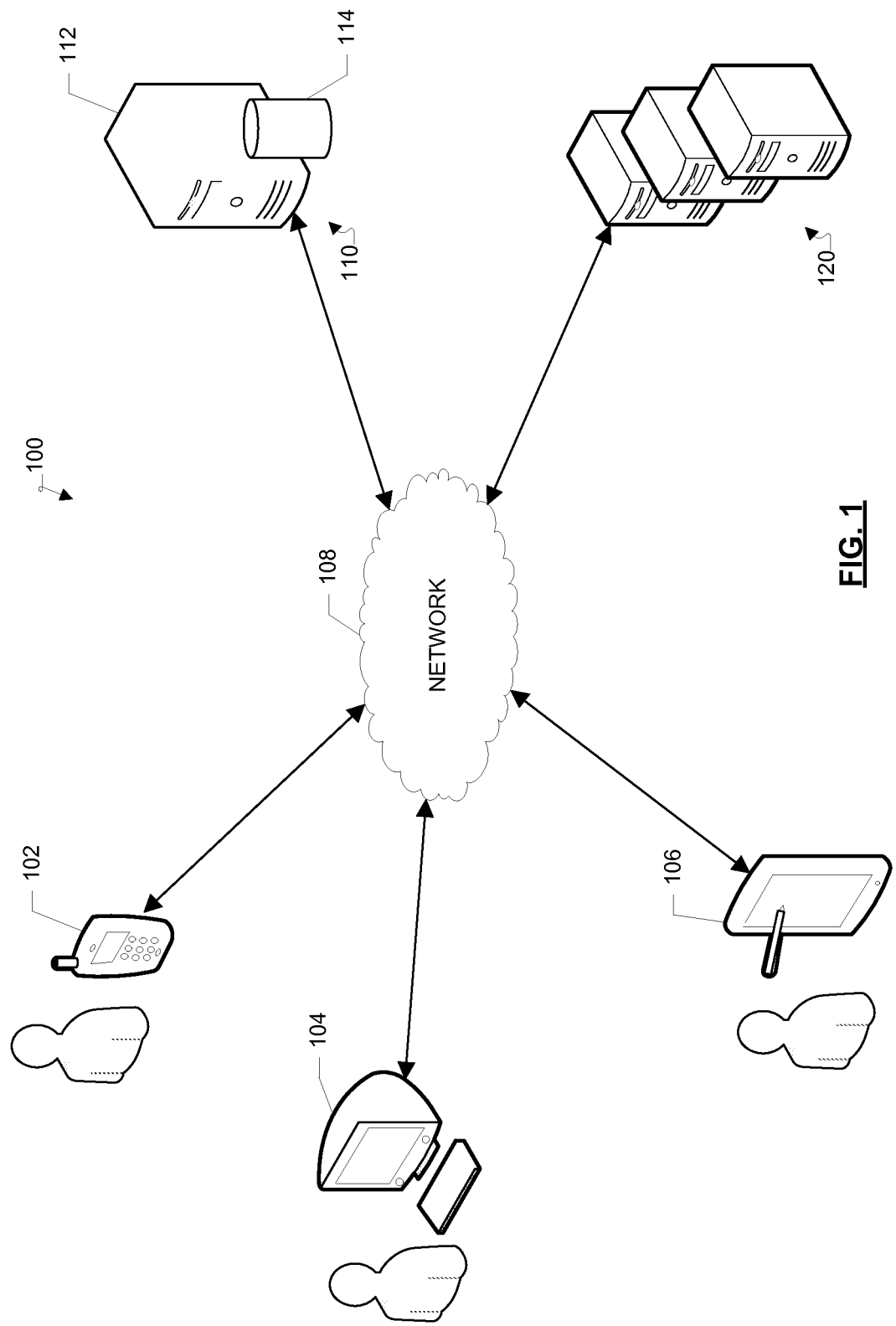
FIG. 1 is a diagram of an exemplary system for suggesting target recipients for a message.

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

When sharing a status update or another kind of post in a social network, users select an audience with whom to share the update or post. The selection of the audience may be done manually, by adding sets of recipients, a person or a group of people from the user's contacts at the social network. Automatic selection of audience is limited to using the audience from a previously shared status update or post. Choosing the right audience can take up significant time and unnecessarily clutter the sharing experience.

Methods and systems for automatically selecting and suggesting a target audience to a user sharing content in a social network or sending a message in an email application are provided herein. In the context of a social network, when a social network system receives a composed message such as, for example, a post or a status update, the system automatically suggests one or more target recipients to the user, to help the user determine with whom to share the message. To that end, the system processes message attributes of the received message, to make the target recipient recommendation. The message attributes include but are not limited to, message content, the time of day when the message is composed, a location or where the message is composed (e.g., at work or at home), attachment information, or other similar signals that are automatically available to the system.

According to one example aspect, the system further identifies a group of recipients with whom the user has previously interacted. That is, any recipient who has previously received a message from the user or a recipient from whom the user has received a message is identified by the system. The system then computes a relevance score for each recipient in the group. In one example implementation, the relevance score corresponds to how closely each recipient in the group of recipients relates to the identified message attributes. In another example implementation, the relevance score corresponds to how often each recipient in the group of recipients has interacted with the user. In yet another example, the relevance score corresponds to how each recipient in the group of recipients has interacted with the user. Based on the relevance score, each recipient is rated and the top ranked recipients from the group are proposed as target recipients to the user. The user may then indicate whether he or she would like more or fewer target recipients, and the system adds or removes target recipients from the list of target recipients, according to the recipients' relevance score. A recipient, as used herein, includes individuals as well as groups, email lists, or otherwise associated recipients.

According to another aspect of the disclosed technology, a user may post messages about an interest such as tennis to a group of contacts with whom the users plays tennis. Such messages may include word such as, for example, "racquet" or "Grand Slam." The user may also post messages about another interest, such as music, to another group of contacts. Such messages may include words such as, for example, "rock" or "guitar." A machine-learning model might learn that, when words "racquet" or "Grand Slam" are in a message, such words are a good indicator that the message pertains to contacts with whom the user discusses tennis. Such contacts may be flagged as being part of a "tennis" group of contacts. A machine-learning model may also learn that words like "rock" and "guitar" are a good indicator for contact with whom the user discusses music. Such contacts may be flagged as being part of a "music" group of contacts. When the system receives a message that includes the word "racquet," for example, the system may determine, based on, for example, prior messages that included the word "racquet," that the contacts in the "tennis" group should be proposed to the user. A contact may belong to multiple groups, for example, to both the "music" group and "tennis" group.

To that end, the system may identify a top, most relevant previously shared message and copy its recipient list. The system may also identify a group of most relevant previously shared messages and use the group's recipients. The group's recipients may be cross-referenced and a union or an intersection of the recipients from the most relevant previously shared messages may be used to generate a target recipient recommendation to the user.

When another entity has previously shared a message that has message attributes that correspond to the message attributes of the received message, the entity may also be suggested as a target recipient. The audience of that entity's message may likewise be suggested to the user as target recipients. Thus, target recipients may be selected not only from the user's contacts, but also from audiences to which entities who are not connected with the user have shared. To the extent a target recipient who is not connected to the user is selected, the system may alert the user to the fact that the user is not connected to the particular target recipient. Furthermore, a justification or a reason for why the particular target recipient who is not connected to the user was selected by the system may be provided to the user. For example, the system may say "Entity X was recommended because they publicly shared a similar entry."

Only entries that are visible to the sharing user are considered by the system. Entries from entities not connected to the user may be considered for determining the target audience if they were shared publicly. In addition, an entity or user may be given the choice to opt out of having their entries used according to the methods disclosed herein. Alternatively, entities may be given the choice to consent to having their entries used according to the methods disclosed herein. In addition, an entity may be given the option to consent to being automatically suggested to unconnected entities or to receiving target recipient recommendations.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

FIG. 1 illustrates an example client-server network that provides for suggesting target recipients for a message. A network 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to identify message attributes of a received message, identify a group of recipients with whom the user has interacted previously and computer relevance scores for each recipient so as to rank the recipients in order to determine which recipients are to be proposed to the user as target recipients for a message.

Data store 114 may also store recipient information, interaction information for the user and the various recipients as well as data pertaining to previously shared messages. Server 110 or application servers 120 may host an application within which some of the processes discussed herein are implemented. For example, server 110 or application servers 120 process message attributes of a received message and compare them to the message attributes of a previously shared message.

The server 110 or application servers 120 may cause the identification of recipients with whom the user has previously interacted and computing relevance scores for the identified recipients. The server 110 or application servers 120 may rank the recipients according to their relevance scores and determine target recipients based on the top rated relevance scores. The server 110 or application servers 120 may cause a suggestion to be generated that includes a list of the determined target recipients. The system may further process the list of the determined target recipients and further filter or otherwise process the list. For example, the list of the determined tarter recipients may be filtered based on interaction history or user preferences.

In some example aspects, electronic devices or client devices, as used interchangeably herein, 102, 104 and 106 can be computing devices such as smartphones, PDAs, portable media players, tablet computers, televisions or other displays with one or more processors coupled thereto or embedded therein, or other appropriate computing devices that can be used for running a mobile application.

Electronic devices 102-106 may have one or more processors embedded therein or attached thereto, or other appropriate computing devices that can be used for accessing a host, such as server 110. In the example of FIG. 1, electronic device 102 is depicted as a smartphone, electronic device 104 is depicted as a tablet computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

Application servers 120 are in communication with the electronic devices 102-106 through network 108. Each electronic device 102-106 may be a client device or a host device. In some example aspects, server 110 can be a single computing device such as a computer server. In other implementations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
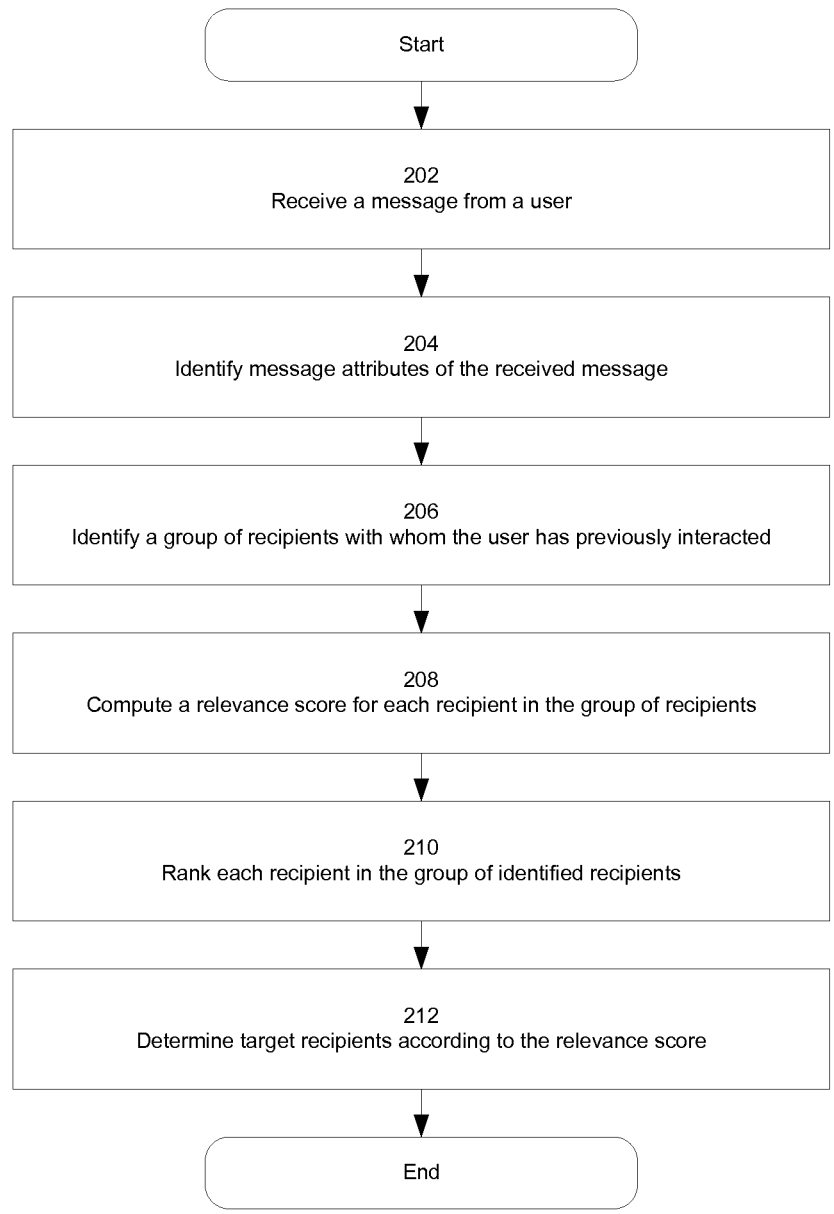
FIG. 2 illustrates a flow diagram of an example process for suggesting target recipients for a message.

FIG. 2 illustrates a flow diagram of an example process 200 for suggesting target recipients for a message. The process 200 starts and at block 202, a message from a user is received in the system. A message may include, but is not limited to, a social network post, a chat session, or any other kind of an electronic message that may be composed, generated or created by a user for sharing with other users. The message may, therefore, also be a link, a photograph, or a group SMS/MMS.

At block 204, the system identifies the message attributes of the received message. Message attributes include, but are not limited to, message content, a time stamp for when the message was composed or received by the system, attachment information, and a location. Once the message attributes of the received message are identified, the system identifies a group of recipients with whom the user has previously interacted, at block 206. The recipients may be those who have sent a message to the user, those to whom the user has sent a message, those who commented on a social network post published by the user, or otherwise previously interacted with the user. According to one aspect, the recipients may also include those who have attended the same events as the user, have been captured in photographs with the user or are part of the same group, list or community as the user.

According to one aspect, the system may process the message attributes to identify a signal that is used to identify the group of recipients with whom the user has previously interacted. The signal may serve as an additional measure to narrow the pool of possible recipients. As such, instead of utilizing all of the recipients with whom the user has previously interacted, the system may utilize a smaller subset of the recipients, based on the signal, in order to make processing quicker and more efficient.

At block 208, the system computes a relevance score for each recipient in the identified group of recipients. The relevance score corresponds to at least one of, how closely each recipient relates to the identified message attributes or how often each recipient in the group of recipients has interacted with the user. According to one implementation, the system may check whether there is a relationship or correlation between the attributes identified for the message and each of the identified recipients. The higher the correlation, the higher the relevance score for a particular recipient. For example, when one of the message attributes determined based on the content of the message is "tennis," the system may check whether any of the identified recipients have previously interacted with the user about "tennis." A high relevance score may indicate that, the user and the recipient have corresponded about "tennis," or have discussed "tennis" together, or have sent information to each other about "tennis." As a further example, when one of the message attributes is that the location is "office," a high relevance score may indicate that the user has corresponded with a particular recipient when the user is at work, that the recipient may work with the user, or the like.

The system may rate some message attributes higher or lower than others. There may be a hierarchy of message attributes, that enables a system to focus on more important attributes. Thus, when more than one message attributes are identified for a particular message, the system may weigh message attributes according to importance and thus, generate a relevance score that is weighted. For example, location and content may be weighted higher than, for example, attachment. Timestamp information may be weighted less heavily than location information but more heavily than attachment information.

According to another implementation, when computing the relevance score, the system may check or how often each recipient in the group of recipients has interacted with the user. To that end, the system may check various parameters such as, for example, how often the user has selected a particular recipient as a recipient. Additionally, the system may check how often the system may have generated a target recipient recommendation suggesting a particular recipient as a target recipient and the user approved the recommendation.

At block 210, the system ranks each recipient in the group of identified recipients. The recipients are rated to their individual computed relevance scores. In other words, a list may be created where the recipients with the highest relevance scores are listed at the top, in descending order. At block 212, the system determines the target recipients according to the ranked relevance scores. Thus, the top ranked recipients may be selected as target recipients. There may be implemented a default value such as, for example, "5" which indicates that the top five rated recipients are automatically selected by the system as target recipients. The system may then generate a target recipient recommendation for the user. The recommendation includes a list of target recipients determined by the system at block 212.

Once the target recipient recommendation is provided to the user, the user may respond and indicate whether he or she would like more or fewer target recipients, and the system may expand or narrow its list of target recipients, based on the user's indication. Thus, the system may adjust the list of determined target recipients and generate a new target recipient recommendation for the user that includes the adjusted list of target recipients for the message.

Figure 3:
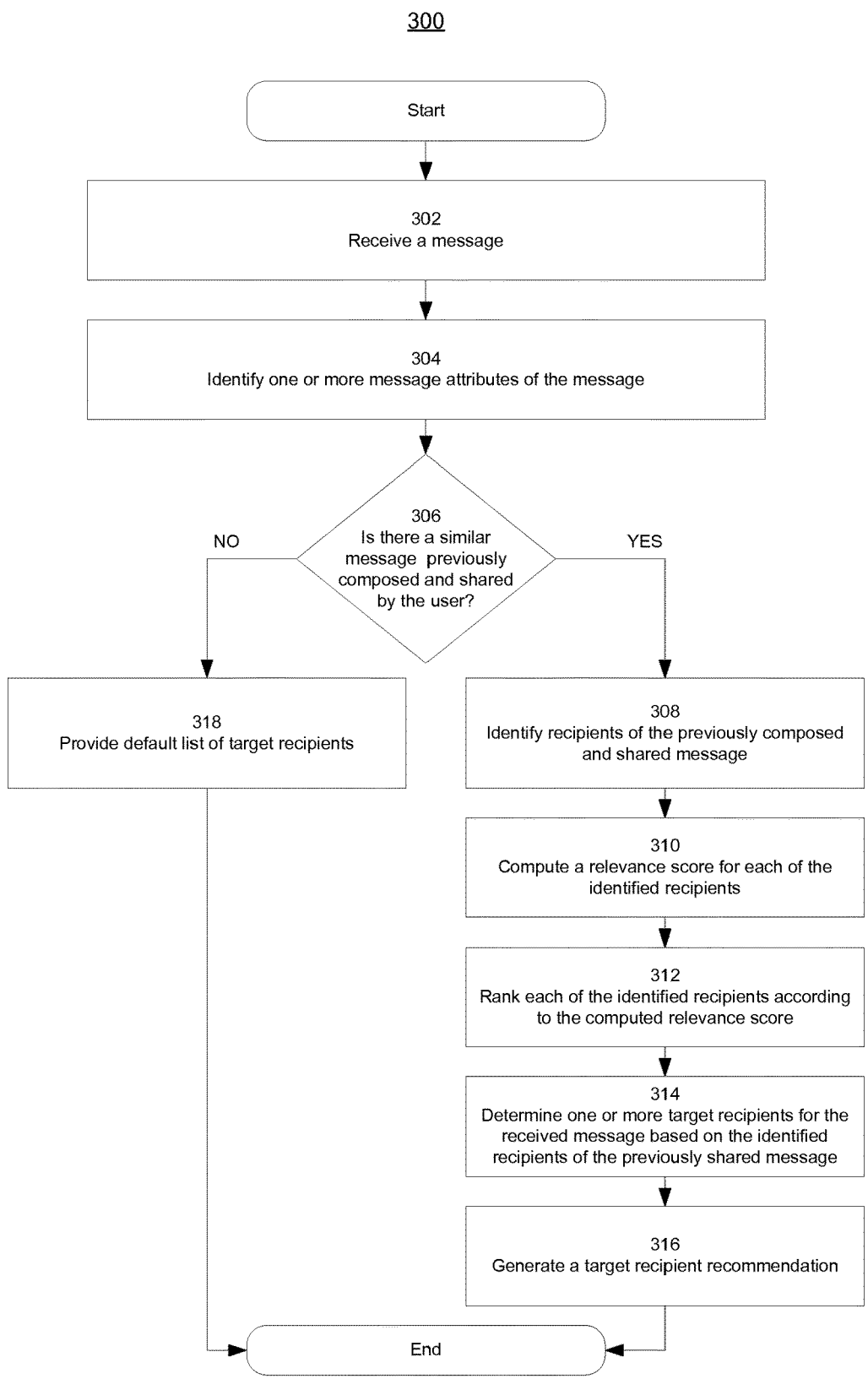
FIG. 3 illustrates a flow diagram of an example process for suggesting target recipients for a message

FIG. 3 illustrates a flow diagram of an example process 300 for suggesting target recipients for a message. The process 300 starts and at block 302 the system receives a message composed by a user for sharing with others. At block 304, the system identifies message attributes of the received message. As discussed above, with reference to FIG. 2, a message attribute may be derived from message content, timestamp, location where the message was composed, or other information determinable from a composed message. According to an aspect of the disclosed technology, signals that are readily identifiable from the message or the system are used as to derive message attributes, rather than signals that need to be deducted, or obtained elsewhere. Therefore, the location of the user when the user composes the message, a device's IP address, and a time of the day may be additional signals identifiable from the message or the system. Such additional signals may also serve as a basis for identifying message attributes.

When identifying message attributes from message content, all or part of the message content may be considered. Additional processing may be done on the message content to identify key words that are more likely to be meaningful in serving as message attributes. For example, words like "at," "in," "or" may automatically be disregarded.

At block 306, the system determines whether there is a similar message previously composed and shared by the user. Such a similar message that was previously composed and shared by the user is a message that has a message attribute that corresponds to the identified message attributes of the received message. The system may identify such messages by comparing the message attributes identified from the received message to the message attributes of the similar messages that were previously composed and shared by the user. Text comparison techniques may be used, for such comparison. For example, the attributes, or the value or content thereof, may be identical, related or similar. The attributes may fall into the same general category of attributes or be otherwise linked together. For example, when the content of a message is used as a message attribute, and a message attribute "tennis" is identified by the system, terms such as "Grand Slam" and "U.S. Open" are deemed to correspond to "tennis." Likewise, if a received message had an attribute "studying," "homework" and "university" would correspond, although the words are not similar or identical.

According to one aspect, the author of one or more similar messages previously composed and shared by the user may be the same as the author who composed the received message. That is, according to one implementation, the author of a similar message previously composed and shared by the user may be the user. The system may process the user's own, previously composed and shared messages, to select a message having a message attribute that corresponds to a message attribute of the received message.

According to another aspect, the authors may be different entities who are connected to each other at the system, belong to the same group or the like, or the authors may have a history of communications or interactions with each other. Thus, similar messages composed and shared by the user's contacts or another subset of a system's users may also be considered by the system at block 306. According to yet another aspect, a system-wide message repository may be made available for such message selection. Such non-user originated messages may be filtered based on the user's interaction with the message. For example, only messages to which the user has replied, has commented on, has shared or forwarded, or otherwise affirmatively interacted with, may be considered.

The system may identify one similar message previously composed and shared by the user or a group of such messages. When a group of messages is identified, the system may further process the identified messages to find a message that is most relevant. For example, criteria such as the age of a message, the location from which a message was shared and the time stamp of a message may serve as additional filters for selecting a most relevant similar message previously composed and shared by the user.

When one or more similar messages previously composed and shared by the user are identified at block 306, the system identifies the recipients of such message at block 308. The system may refer to a server 110 or applications server 120 in order to identify the recipients. Data store 114 may house the records from which the recipients of the previously shared message may be identified.

At block 310, the system computes a relevance score for each of the identified recipients of the similar messages previously composed and shared by the user. The relevance score may correspond to how often each identified recipient has been on a list of recipients in the identified one or more similar messages previously composed and shared by the user. The relevance score may indicate a probability of inclusion score for each of the identified recipients.

At block 312, the system ranks each of the identified recipients of the one or more similar messages identified at block 306. Each of the identified recipients is ranked according to the computed relevance score at block 312. At block 314, the system determines the target recipients according to the ranked relevance scores. Thus, as previously discussed, the top ranked recipients may be selected as target recipients.

A user may personalize a mechanism that pre-sets the size of the determined group of target recipients. For example, the user may manually change the threshold, which would affect the size of the group. To that end, there may be implemented a default value which indicates that the top "x" recipients are automatically selected by the system as target recipients. The system generates a target recipient recommendation for the user at block 316. The recommendation includes a list of the target recipients determined by the system. The recommendation may be provided to a user as a GUI element, for example. The target recipients may be automatically filled in by the system in a "to:" field of the received message.

Once the target recipient recommendation is provided to the user, the user may respond and indicate whether he or she would like more or fewer target recipients, and the system may expand or narrow its list of target recipients, based on the user's indication. Thus, the system may adjust the list of determined target recipients and generate a new target recipient recommendation for the user that includes the adjusted list of target recipients for the message. In addition to the user increasing and decreasing the number of recipients, the user may also delete a single recipient from the list. For example, a user may delete a recipient who was highly ranked by the system and add a lower ranked recipient who was not recommended by the system. Alternatively, the user may have recently connected to a person who has a certain interest of which the system is not yet aware and thus, the user may add the new connection to a post although the new connection has a very low score.

Manual adding and removing of recipients provides valuable learning data to the system, for the system to learn about a particular user's preferences for the future. According to one aspect, when a particular recipient who has a low score is repeatedly manually added by the user to the list of recipients, the recipient may be promoted in the future such that the recipient is included as a target recipient despite a low score. Similarly, when a particular recipient who has a high score is repeatedly manually removed by the user from the list of recipients, the recipient may be demoted in the future such that the recipient is excluded as a target recipient despite a high score.

When the system is not able to identify a similar message previously composed and shared by the user, the system may provide a default target recipient list to the user, at illustrated at block 318. The default target recipient list may include the user's contacts, recently used recipients or contacts who are online, for example.

According to an aspect of the disclosed technology, a most relevant similar message previously composed and shared by the user may be identified by the system. The most relevant similar message may be based on a high similarity of overlap of the message attributes of the received message and the message attributes of the similar message previously composed and shared by the user. The system may be implemented such that the exact set of recipients is determined for the received message as the recipients identified from the most relevant similar message previously composed and shared by the user.

The system may also be configured such that a group of most relevant similar message previously composed and shared by the user is identified. In such implementation, the system may determine the target recipients for the received message based on the group's recipients. The group's recipients may be cross-referenced and a union or an intersection of the recipients from the group of most relevant previously shared messages may be identified as the target recipients for the received message.

According to an aspect of the disclosed technology, instead of identifying similar messages previously composed and shared by the user at the time the message is received, a computer learning model may be implemented that computes a relevance score for every recipient with whom the user has previously interacted, using the previously learned model. A previously learned model may be, for example, a linear regression model, a support vector regression model, a decision tree regression model or a neural network-based regression model. To implement such a model, the system would have a set of message that the user has previously composed with their recipients. Letting $M_i$ be the attribute representation of the i-th message that the user has composed and $R_i$ the set of X recipients (or recipient circles) of this message the equation may be: $R_i = \{R_{i1}, R_{i2}, \ldots, R_{iX}\}$ Letting there be I such messages, the set of messages with recipient sets $\{(M_1, R_1), (M_2, R_2), \ldots, (M_1, R_1)\}$ may be used as training data for any of the regression models named above.

Figure 4:
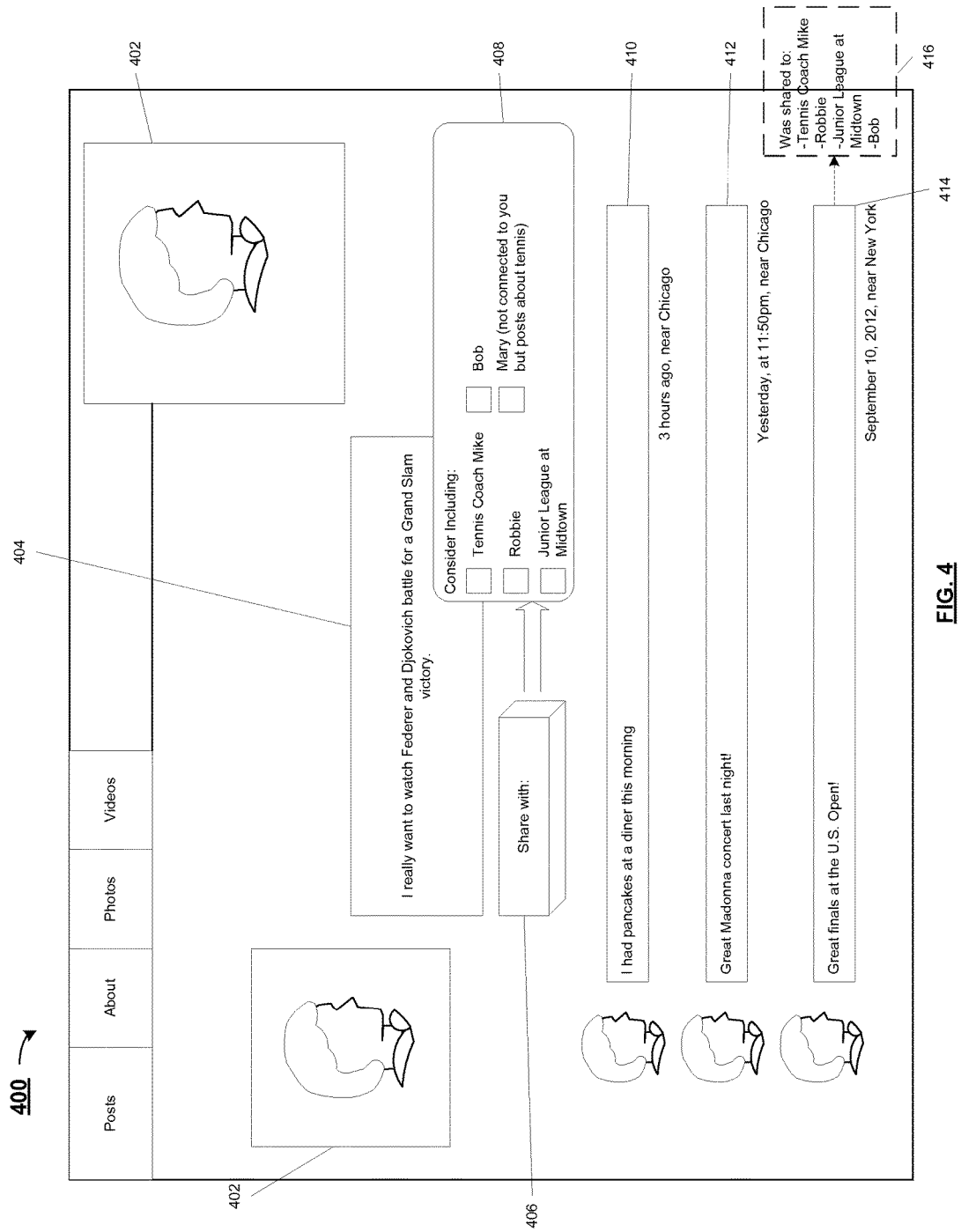
FIG. 4 illustrates an example target recipients suggestion for a message.

FIG. 4 illustrates an example target recipients suggestion for a message. FIG. 4 illustrates an example user interface where a user 402 composes a message 404. When the user 402 enters text of the message 404, the system processes the entered text and identifies the message attributes. Based on the text of message 304, specifically, based on the words "Federer," "Djokovich" and "Grand Slam," the system determines that the message is about tennis and uses "tennis" as a message attribute. To that end, the system makes the connection that terms "Federer," "Djokovich" and "Grand Slam" pertain to tennis. The connection may be made based on prior messages, a learning model, or an algorithm. The correlation between terms and attributes may also be partially or fully pre-programmed.

As previously described in the implementation of FIG. 3, the system may process messages previously shared by user 302. The system looks for similar messages previously composed and shared by the user. In the present example, the system looks for messages that are related to "tennis," thus, the system identifies message 414 that was previously shared by the user 402. Message 414 is identified by the system because it includes the term "U.S. Open," which relates to tennis.

Furthermore, the system may identify the date of the message 414 and the location, when determining that message 414 pertains to tennis. The system may conclude that it is likely that message 414 pertains to tennis because message 414 was shared on Sep. 10, 2012, the date the U.S. Open Finals 2012 were held, near New York, where the U.S. Open Championship is known to take place.

The system identifies the list of recipients 416 for message 414 and provides some or all of the same recipients to the user 402 in a target recipient suggestion 408. The target recipient suggestion 408 also includes "Mary," who is noted not to be connected to user 302. "Mary" may have been suggested due to the system looking not only at user 402's messages, but at public posts of other users, including "Mary." The target recipient "Mary" may have publicly posted about tennis and may be suggested for that reason. Alternatively, "Mary" may have been suggested because an entity with whom the user 402 is connected had "Mary" as an audience in a previously shared message about tennis. As previously mentioned, any user may opt out of having their data used according to the methods disclosed herein.

The suggestion 408 may be generated and provided automatically by the system, or the user may request such suggestions. For example, the user 402 may select to receive the suggestion 408 by pressing button 406 or the like. Suggestion 408 may be provided to the user 402 in real-time, as the user types text for message 404. The target recipient list may be changed or updated as more text is entered.

A mechanism may be implemented that only a certain, pre-determined number of message attributes may be used for a given received message. For example, when a message includes text from which five message attributes are derived, according to one aspect, only three of the message attributes may be used for identifying target recipients. Selecting the three message attributes may include ranking the frequency with which a given message attribute is engaged by the user, the number of target recipients that is generated for a given message attribute (e.g., the number is too high or too low) or other categories that may help in prioritizing among message attributes.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
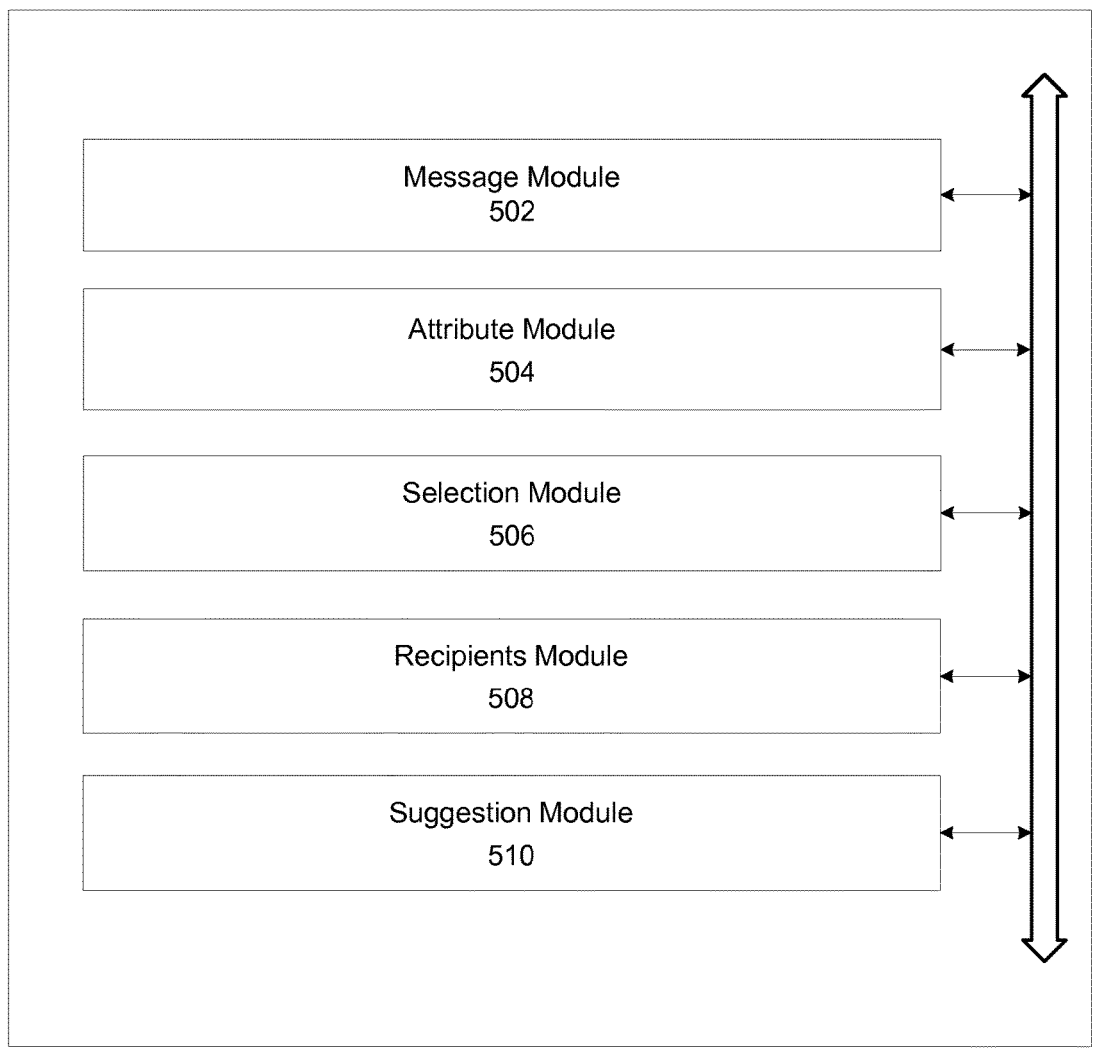
FIG. 5 conceptually illustrates an example of a system for suggesting target recipients for a message.

FIG. 5 illustrates an example of system 500 for suggesting target recipients for a message, in accordance with various aspects of the subject technology. System 500 comprises a a message module 502, a message attribute module, 504, a prior recipients module 506, a scoring module 508, a ranking module 510, and a target recipients module 512.

The message module 502 is configured to receive a message for sharing with others. The message attribute module 504 is configured to identify message attributes of the received message. The prior recipients module 506 is configured to identify a group of recipients with whom the user has previously interacted. The scoring module 508 is configured to compute a relevance score for each recipient in the group of recipients, wherein the relevance score corresponds to at least one of how closely each recipient in the group of recipients relates to the identified message attributes or how often each recipient in the group of recipients has interacted with the user. The ranking module 510 is configured to rank each recipient in the group of recipients according to the relevance score. The target recipients module 512 is configured to determine one or more target recipients for the received message from the group of target recipients ranked according to the relevance score, the determined target recipients having a ranking within a predetermined threshold of highest relevance scores.

The system may also include a recommendation module 514, configured to generate a target recipient recommendation comprising a list of the determined one or more target recipients. The recommendation module 514 may further be configured to receive from the user an indication to generate a new target recipient recommendation comprising at least one of, more determined target recipients or fewer determined target recipients, adjust the list of determined target recipients for the received message based on the indication received from the user and to generate a new target recipient recommendation comprising the adjusted list of determined target recipients from the received message.

The prior recipients module 506 may further be configured to process the message attributes to identify a signal for identifying the group of recipients with whom the user has previously interacted.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 6:
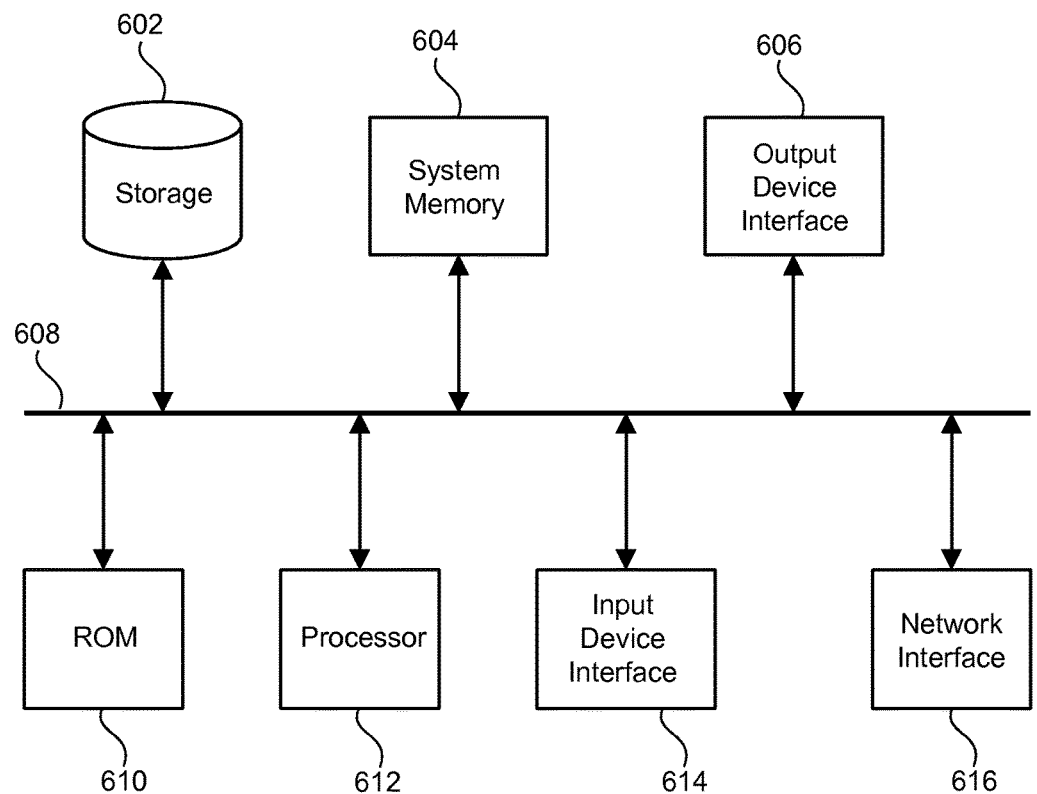
FIG. 6 conceptually illustrates an electronic system with which some aspects of the subject technology are implemented.

FIG. 6 conceptually illustrates an electronic system with which some aspects of the subject technology are implemented. Electronic system 600 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method comprising:
    providing a computer learning model, the computer learning model being trained by using a set of previously composed messages by a user, each message from the set of previously composed messages including a group of recipients with whom the user shared each message;
    computing a relevance score for each recipient in the group of recipients of each message from the set of previously composed messages using the computer learning model, wherein the relevance score for each recipient in the group of recipients is based at least in part on whether each recipient has previously further interacted with the user based on previous correspondence sent to the user, the previous correspondence including message content related to message attributes of the set of previously composed messages by the user, the message attributes including an attribute indicating a location corresponding to where the user previously composed a particular message from the set of previously composed messages, and the relevance score of each recipient is further based on the attribute indicating the location;
    ranking each recipient in the group of recipients according to the relevance score;
    receiving, from the user, a message for sharing with others;
    filtering the group of recipients to determine a subset of the group of recipients having a ranking within a predetermined threshold of highest relevance scores, the subset including one or more target recipients for the received message, wherein the one or more target recipients are determined based at least in part on an intersection of recipients from the group of recipients of each message from the set of previously composed messages; and
    providing, for transmission, a target recipient recommendation to the user in response to the received message, the target recipient recommendation comprising a list identifying the one or more target recipients,
    wherein computing the relevance score for each recipient in the group of recipients of each message from the set of previously composed messages further comprises:
    determining respective weights for the message attributes related to an indication of importance, wherein a first message attribute corresponding to a particular location and a second message attribute corresponding to content are weighted higher than a third message attribute corresponding to timestamp information and a fourth message attribute corresponding to an attachment; and generating the relevance score based on a first respective message attribute based at least in part on the determined respective weights.

2. The computer-implemented method of claim 1, further comprising:

identifying the message attributes from message content of the set of previously composed messages;

identifying the group of recipients with whom the user has previously interacted; and processing the message attributes to identify a signal for identifying the group of recipients with whom the user has previously interacted.

3. The computer-implemented method of claim 1, wherein the relevance score corresponds to how often each recipient in the group of recipients has interacted with the user.

4. The computer-implemented method of claim 1, further comprising:

generating, in response to the filtering, the target recipient recommendation.

5. The computer-implemented method of claim 4, further comprising:

receiving from the user an indication to generate a new target recipient recommendation comprising at least one of, more target recipients or fewer target recipients than indicated in a list of indicated one or more target recipients.

6. The computer-implemented method of claim 5, further comprising:

adjusting the list of indicated one or more target recipients for the received message based on the indication received from the user; and generating the new target recipient recommendation comprising the adjusted list of indicated one or more target recipients from the received message.

7. The computer-implemented method of claim 1, wherein the message is a social network post.

8. The computer-implemented method of claim 1, wherein the message is an email message.

9. A non-transitory machine-readable medium comprising instructions stored therein, which when executed by one or more processors, cause the one or more processors to perform operations comprising:

identifying a group of recipients of messages previously composed and shared by a user;

providing a computer learning model, the computer learning model being trained by using a set of previously composed messages by the user, each message from the set of previously composed messages including the group of recipients with whom the user shared each message;

computing a relevance score for each recipient of the identified group of recipients using the trained computer learning model, wherein the relevance score corresponds to how often each recipient has been included in a list of recipients in each of the messages previously composed and shared by the user, the relevance score further indicating how often the user has selected each recipient as a particular recipient in the identified group of recipients of the messages previously composed and shared by the user, and wherein the relevance score for each recipient in the identified group of recipients is based at least in part on whether each recipient has previously further interacted with the user based on previous correspondence sent to the user, the previous correspondence including message content related to message attributes of the set of previously composed messages by the user, the message attributes including an attribute indicating a location corresponding to where the user previously composed a particular message from the set of previously composed messages, and the relevance score of each recipient is further based on the attribute indicating the location;

ranking each recipient of the identified group of recipients according to the computed relevance score;

receiving, from the user, a message for sharing with others at a social network;

filtering the identified group of recipients to determine a subset of the identified group of recipients having a ranking within a predetermined threshold of highest relevance scores, the subset including one or more target recipients for the received message, wherein the one or more target recipients are determined based at least in part on an intersection of recipients from the identified group of recipients of the messages previously composed and shared by the user; and providing, for transmission, a target recipient recommendation to the user in response to the received message, the target recipient recommendation comprising a list identifying the one or more target recipients, wherein computing the relevance score for each recipient in the group of recipients of each message from the set of previously composed messages further comprises:

determining respective weights for the message attributes related to an indication of importance, wherein a first message attribute corresponding to a particular location and a second message attribute corresponding to content are weighted higher than a third message attribute corresponding to timestamp information and a fourth message attribute corresponding to an attachment; and generating the relevance score based on a first respective message attribute based at least in part on the determined respective weights.

10. The non-transitory machine-readable medium of claim 9, the operations further comprising:

generating, in response to the filtering, the target recipient recommendation.

11. The non-transitory machine-readable medium of claim 9, wherein the received message is a social network post.

12. The non-transitory machine-readable medium of claim 9, wherein the message is an email message.

13. The non-transitory machine-readable medium of claim 9, wherein the operations further comprise:

identifying message attributes from message content of the set of previously composed messages; and identifying the group of recipients with whom the user has previously interacted, wherein identifying the messages previously composed and shared by the user comprises comparing message attributes of the at least one message previously shared by each recipient of the group of recipients to message attributes of the messages previously composed and shared by the user.

14. The non-transitory machine-readable medium of claim 13, wherein the messages previously composed and shared by the user are shared by the same user who composed the received message.

15. The non-transitory machine-readable medium of claim 9, wherein identifying the messages previously composed and shared by the user comprises selecting a group of most relevant messages previously composed and shared by the user.

16. The non-transitory machine-readable medium of claim 15, the operations further comprising:
    identifying recipients of the selected group of most relevant previously shared messages; and
    determining one or more target recipients for the received message based on the identified recipients of the selected group of the most relevant previously shared messages.

17. A system comprising:
    one or more processors; and
    a machine-readable medium comprising instructions stored therein, which when executed by the one or more processors, cause the one or more processors to perform operations comprising:
        providing a computer learning model computer learning model being trained by using a set of previously composed messages by a user, each message from the set of previously composed messages including a group of recipients with whom the user shared each message;
        computing a relevance score for each recipient in the group of recipients of each message from the set of previously composed messages using the trained computer learning model, wherein the relevance score for each recipient in the group of recipients is based at least in part on whether each recipient has previously further interacted with the user based on previous correspondence sent to the user, the previous correspondence including message content related to message attributes of messages from the set of previously composed messages by the user, the message attributes including an attribute indicating a location corresponding to where the user previously composed a particular message from the set of previously composed messages, and the relevance score of each recipient is further based on the attribute indicating the location;
        ranking each recipient in the group of recipients according to the relevance score;
        receiving, from the user, a message for sharing with others;
        filtering the group of recipients to determine a subset of the group of recipients having a ranking within a predetermined threshold of highest relevance scores, the subset including one or more target recipients for the received message, wherein the one or more target recipients are determined based at least in part on an intersection of recipients from the group of recipients with whom the user shared each message from the set of previously composed messages; and
        providing, for transmission, a target recipient recommendation to the user in response to the received message, the target recipient recommendation comprising a list identifying the one or more target recipients,
        wherein computing the relevance score for each recipient in the group of recipients of each message from the set of previously composed messages further comprises:
            determining respective weights for the message attributes related to an indication of importance, wherein a first message attribute corresponding to a particular location and a second message attribute corresponding to content are weighted higher than a third message attribute corresponding to timestamp information and a fourth message attribute corresponding to an attachment; and
            generating the relevance score based on a first respective message attribute based at least in part on the determined respective weights.

18. The system of claim 17, wherein the operations comprise generating, in response to the filtering, the target recipient recommendation.

19. The system of claim 18, wherein the operations comprise:
    receiving from the user an indication to generate a new target recipient recommendation comprising at least one of, more target recipients or fewer target recipients;
    adjusting a list of indicated one or more target recipients for the received message based on the indication received from the user; and
    generating the new target recipient recommendation comprising the adjusted list of indicated one or more target recipients for the received message.

20. The system of claim 17, wherein the operations comprise:
    identifying the message attributes from message content of the set of previously composed messages;
    identifying the group of recipients with whom the user has previously interacted; and
    processing the message attributes to identify a signal for identifying the group of recipients with whom the user has previously interacted.

21. The computer-implemented method of claim 1, wherein identifying the message attributes comprises:
    determining a prioritized listing of the message attributes, wherein the message attributes are prioritized based on a weight assigned to each of the message attributes, and wherein the relevance score is computed using the prioritized listing of the message attributes.

22. The computer-implemented method of claim 21, further comprising:
    selecting a predetermined number of message attributes from the prioritized listing of the message attributes, the predetermined number of message attributes being a subset of the prioritized listing of the message attributes, wherein the relevance score is computed using the selected predetermined number of message attributes.

23. The computer-implemented method of claim 2, wherein identifying the message attributes comprises:
    identifying one or more keywords from the message content of the received message;
    associating the one or more keywords to a message attribute for the received message; and
    comparing the message attribute of the received message to a message attribute of at least one message previously shared with the user,
    wherein the relevance score corresponds to an amount of correlation between keywords of the at least one message previously shared with the user and the one or more keywords of the received message.

24. The computer-implemented method of claim 1, wherein the relevance score indicates that the user has corresponded with a particular recipient when the user is at work based on the attribute indicating the location.

* * * * *